3,522,314
MERCAPTO ALKYL THIOETHER ALKYL ETHERS
Paul F. Warner, Phillips, Tex., assignor to Phillips
Petroleum Company, a corporation of Delaware
No Drawing. Filed Aug. 3, 1967, Ser. No. 658,044
Int. Cl. C07c *149/14;* C09g *1/02*
U.S. Cl. 260—609                                7 Claims

ABSTRACT OF THE DISCLOSURE

The compound represented by

HS—R—O—R—S—R' wherein each R is selected from saturated aliphatic hydrocarbon radicals having one to five carbon atoms and R' is selected from alkyl, cycloalkyl and alkaryl radicals having 8 to 20 carbon atoms, is prepared by the reaction of a dimercaptan with a monoolefin. The compounds have utility with paints, sealing compounds and silver or copper polish compositions. A preferred compound, 3-mercapto-propyl 3-(t-dodecylthio)propyl ether, is a very effective tarnish inhibitor for silver.

BACKGROUND OF THE INVENTION

This invention relates to a heavy mercaptan compound. In one aspect, it relates to a mercaptan compound having very little odor. In another aspect, it relates to a mercaptan compound as a tarnish inhibitor for silver. In another aspect, it relates to a silver polishing compound containing a heavy mercapto ether as a tarnish inhibitor.

SUMMARY OF THE INVENTION

The novel compound of my invention has the general formula represented by

HS—R—O—R—S—R' wherein each R is selected from saturated aliphatic hydrocarbon radicals having one to five carbon atoms and R' is selected from alkyl, cycloalkyl and alkaryl radicals having 8 to 20 carbon atoms.

The compounds falling within this generic formula have very little odor, and display good tarnish inhibition when applied to tarnishable metals such as silver and copper.

DESCRIPTION OF THE PREFERRED EMBODIMENTS

The novel compounds of my invention are conveniently prepared by the interreaction of a monoolefin having from 8 to 20 carbon atoms with a dimercaptan having the generic formula HS—R—O—R—SH, where the R groups are as defined above.

The monoolefins useful for the practice of my invention include not only the monoolefinic straight and branched chain hydrocarbons, but cycloalkyl and aromatic compounds having olefinic side chains as well. The straight and branched chain aliphatic hydrocarbons are preferred.

The reaction is conveniently conducted in the presence of a boron trifluoride-phosphoric acid catalyst. The catalyst composition is prepared by treating orthophosphoric acid of variable water content with anhydrous boron fluoride until complete saturation has been realized. With 100 percent phosphoric acid substantially one mole of boron fluoride is absorbed per mole of acid, while in case of aqueous solutions both the phosphoric acid and the water absorb boron fluoride approximately mole for mole.

No theories are advanced as to the chemistry involved in the preparation of the catalyst, but it is presumed that a type of chemical combination often referred to as a complex or addition compound or compounds has resulted. Where 100 percent phosphoric acid is concerned, the empirical representation of its complex with boron fluoride is $H_3PO_4 \cdot BF_3$. In the same manner catalysts prepared from aqueous phosphoric acid and boron fluoride might be considered to be a mixture of the components $H_3PO_4 \cdot BF_3$ and $H_2O \cdot BF_3$.

The phosphoric acid employed in preparing the preferred catalyst may be in concentrated form, ranging from the 85 percent acid of commercial grade up to about 100 percent $H_3PO_4$; or aqueous solutions containing as little as 20 to 40 percent $H_3PO_4$ may be employed. For most applications the moderately concentrated to concentrated acid is ordinarily preferred. The readily available 85 percent commercial acid yields a very satisfactory catalyst when saturated with boron fluoride. While orthophosphoric acid is preferred in preparing the catalysts of this invention, other oxygen-containing acids of phosphorus, such as for example phosphorus acid ($H_3PO_3$) in aqueous solution, may also be used, although less active catalysts usually result.

Compounds exemplary of those within the generic formula are:

Mercaptomethyl-(t-dodecylthio)methyl ether
5-mercaptoamyl 5-(t-dodecylthio)amyl ether
4-mercaptobutyl 4-(n-octylthio)butyl ether
2-mercaptoethyl 2-(n-eicosylthio)ethyl ether
3-mercaptopropyl 3-(t-dodecylthio)propyl ether The compound having the highest current utility among those within the generic formula is 3-mercaptopropyl 3-(t-dodecylthio)propyl ether, and the preparation and utility of the generic compound of this invention will be discussed below with relation to that specific currently preferred compound.

The preferred compound of my invention, 3-mercaptopropyl 3-(t-dodecylthio)propyl ether, is produced by reacting propylene tetramer with bis-3-mercaptopropyl ether. The reaction conveniently takes place at room temperature. The two reactants are charged to a reactor in a mole ratio of from about 0.5 to 1 to 2 to 1, and catalyst is added in incremental portions until reaction ceases.

The compounds of my invention find utility in the many known areas where mercaptans are usable, and particularly where the normal odor associated with mercaptan compounds is objectionable. Because of the very low odor of the compounds of this invention, they can be used in conjunction with paints, sealing compounds, silver polish compositions, and so forth. The compounds find particular utility in making of silver polish compositions. These compounds not only have the very low odor necessary for a successful polish composition, but have excellent tarnish inhibiting properties. For such an application, the compounds would normally be mixed with a light abrasive agent such as chalk, silica or alumina, a diluent such as water or a lower alcohol, and a suspending agent. Perfumes may be added if desired. Such a composition would usually be comprised of from about 1 to about 40 percent of the compound of my invention.

Example I

A synthesis run was made to produce 3-mercaptopropyl 3-(t-dodecylthio)propyl ether by the reaction of propylene tetramer and bis 3-mercaptopropyl ether. The reaction was conducted in a 1-liter, three neck mixing flask equipped with a reflux condenser, motor driven stirrer and thermometer. The olefin (252 grams, 1.5 moles) and dithiol (316 grams, 1.9 moles) were added to the flask. The flask was maintained at atmospheric temperature, and portions of boron trifluoride phosphoric acid catalyst were added incrementally over the entire run for a total addition of 33.2 grams of catalyst. At the end of the run, the crude product was washed twice with warm water and concentrated by vacuum distillation. Chromatographic analysis indicated that the 3-mercaptopropyl 3-(t-dodecylthio)propyl ether was approximately 90 percent pure. The total yield, based upon dithiol charged, was about 32 percent.

Example II

Clean silver specimens were treated with 3-mercaptopropyl 3-(t-dodecylthio)propyl ether and with n-octadecyl mercaptan. These specimens, along with an untreated specimen, were exposed for one week in a laboratory having a high sulfur content air. At the end of the week, the untreated specimen was heavily tarnished. The specimen treated with n-octyldecyl mercaptan had a light tan coloration and had lost its luster. The specimen treated with 3-mercaptopropyl 3-(t-dodecylthio)propyl ether showed very light traces of tan in some areas, but remained quite lustrous.

Various catalysts of the Friedel-Crafts type, in addition to the boron trifluoride-phosphoric acid catalyst described, may be used in the practice of the invention. Such catalysts may be aluminum chloride, ferric chloride, and sulfuric acid.

I claim:
1. The compound represented by

HS—R—O—R—S—R′ wherein each R is selected from saturated aliphatic hydrocarbon radicals having one to five carbon atoms and R′ is a straight or branched chain aliphatic hydrocarbon radical having 8 to 20 carbon atoms.

2. The compound of claim 1 wherein said R′ is dodecyl.
3. The compound of claim 1 wherein the compound is 3-mercaptopropyl 3-(t-dodecylthio)propyl ether.
4. A compound according to claim 1 wherein the compound is mercaptomethyl-(t-dodecylthio)methyl ether.
5. The compound of claim 1 wherein the compound is 5-mercaptoamyl 5-(t-dodecylthio)amyl ether.
6. The compound of claim 1 wherein the compound is 4-mercaptobutyl 4-(n-octylthio)butyl ether.
7. The compound of claim 1 wherein the compound is 2-mercaptoethyl 2-(n-eicosylthio)ethyl ether.

References Cited

Snyder et al.: "J. Amer. Chem. Soc.," vol. 69 (1947), pp. 2675–77.

CHARLES B. PARKER, Primary Examiner

D. R. PHILLIPS, Assistant Examiner

U.S. Cl. X.R.

106—3, 14; 252—395